United States Patent
Ono et al.

(10) Patent No.: US 6,246,545 B1
(45) Date of Patent: *Jun. 12, 2001

(54) HEAD SLIDER WITH ASYMMETRIC AIR RAILS

(75) Inventors: Hiroaki Ono; Norio Saito, both of Miyagi; Yutaka Soda, Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,792

(22) Filed: Feb. 19, 1998

(30) Foreign Application Priority Data

Feb. 20, 1997 (JP) .................................................. 9-036471

(51) Int. Cl.⁷ ............................................................ G11B 5/60
(52) U.S. Cl. ............................................................ 360/236.7
(58) Field of Search ........................... 360/103, 236.6, 360/236.7, 236.8, 236.9

(56) References Cited

U.S. PATENT DOCUMENTS

| | | | |
|---|---|---|---|
| 5,650,893 | * | 7/1997 | Bolasna et al. ....................... 360/103 |
| 5,734,522 | * | 3/1998 | Shrinkle .................................. 360/103 |

* cited by examiner

*Primary Examiner*—George J. Letscher
(74) *Attorney, Agent, or Firm*—Sonnenschein, Nath & Rosenthal (57) ABSTRACT

To provide a head slider capable of enhancing the electromagnetic transductional characteristic of a magnetic head and a magnetic disk unit provided with the head slider, the head slider provided with a rail on each side and floated over a magnetic disk by air flow, the head slider for reading or recording information from/in the magnetic disk mounted on the rail on one side of the head slider, and the rails formed asymmetrically so that the floated quantity of the rail on the side on which the head slider is mounted is lower than the floated quantity of the rail on the side on which the head slider is not mounted.

12 Claims, 10 Drawing Sheets

HEAD SLIDER WITH ASYMMETRIC AIR RAILS

BACKGROUND OF THE INVENTION

1. Field of the Invention

The present invention relates to a floating type head slider on which a magnetic head for reading and recording information such as data and a program from/on a magnetic disk is mounted and a magnetic disk unit provided with the head slider.

2. Description of Related Art

For example, in a computer system, a hard disk is used for a magnetic disk unit. A magnetic film is formed on both surfaces of a magnetic disk built in the hard disk, data and the like are recorded in a track on the magnetic film, and data and the like recorded in a track on the magnetic film are read by a magnetic head mounted on a head slider floating over the surface of the magnetic disk.

As a mechanical part for driving a floating type head slider on which a magnetic head is mounted and a driving part for driving a magnetic disk are beforehand built in a housing, data and the like can be recorded in relatively high density and high-speed access to recorded data and the like is enabled.

Figure 16:
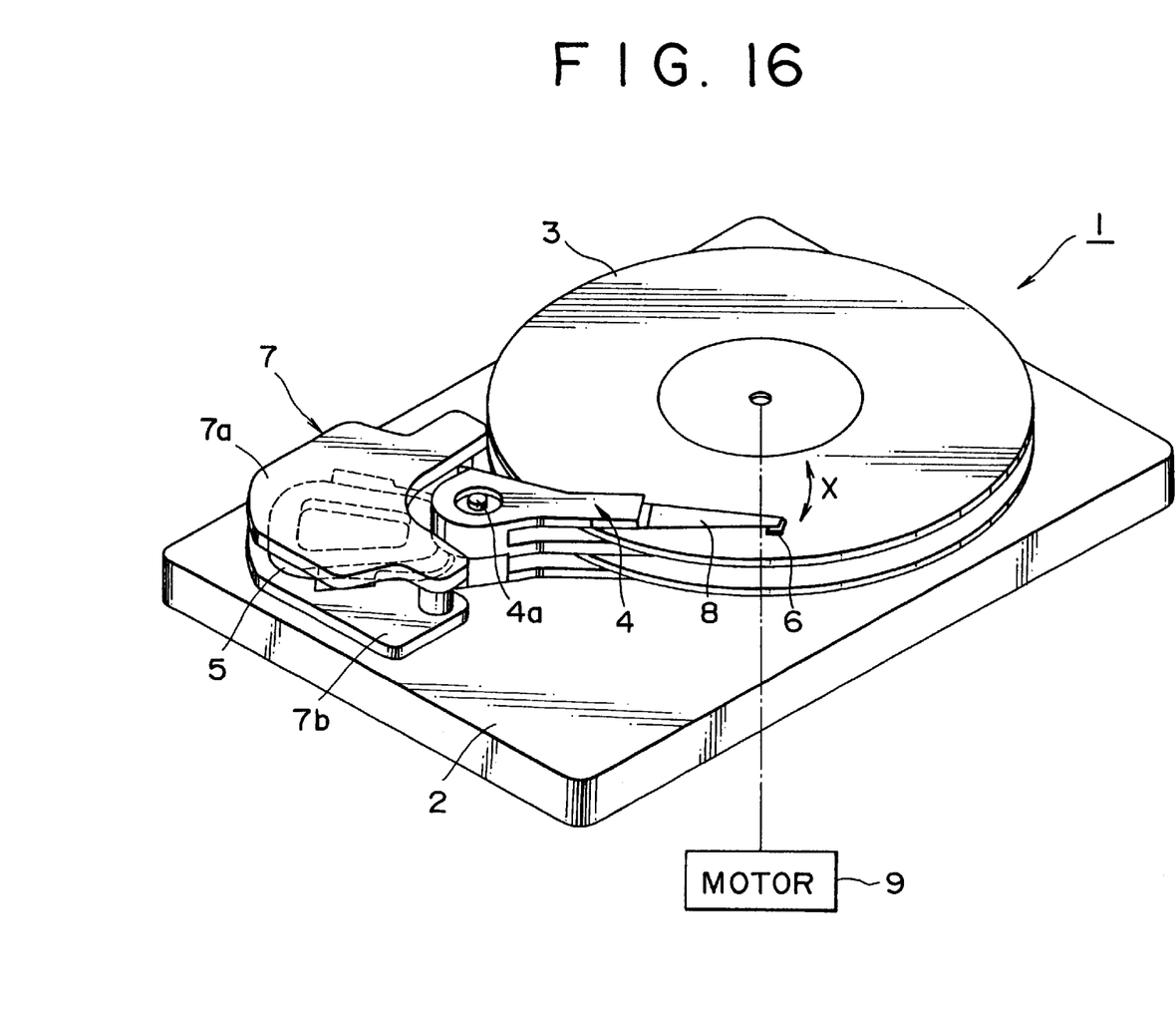
FIG. 16 is a perspective drawing showing a constitutional example of a hard disk which is an example of a conventional type magnetic disk unit.

FIG. 16 is a perspective drawing showing a constitutional example of a hard disk which is an example of a conventional type magnetic disk unit.

In the hard disk 1, a spindle motor 9 is arranged on the reverse side of the flat part of a housing 2 formed of an aluminum alloy and the like and a magnetic disk 3 rotated at fixed angular velocity by the spindle motor 9 is provided.

Further, an arm 4 is attached around a vertical shaft 4a to the housing 2 so that the arm can be swung. A voice coil 5 is attached to one end of the arm 4, one end of a suspension 8 is attached to the other end of the arm 4 and further, a head slider 6 is attached to the other end of the suspension 8. Magnets 7a and 7b are attached on the housing 2 so that the voice coil 5 is held between the magnets. A voice coil motor 7 is formed by the voice coil 5 and the magnets 7a and 7b.

In such constitution, when current is supplied to the voice coil 5 from an external device, the arm 4 is turned around the vertical shaft 4a according to force generated by the magnetic field of the magnets 7a and 7b and current which flows in the voice coil 5. Hereby, the head slider 6 attached to the other end of the suspension 8 extended from the arm 4 is swung in the substantially radial direction of the magnetic disk 3 as shown by an arrow X.

Figure 17:
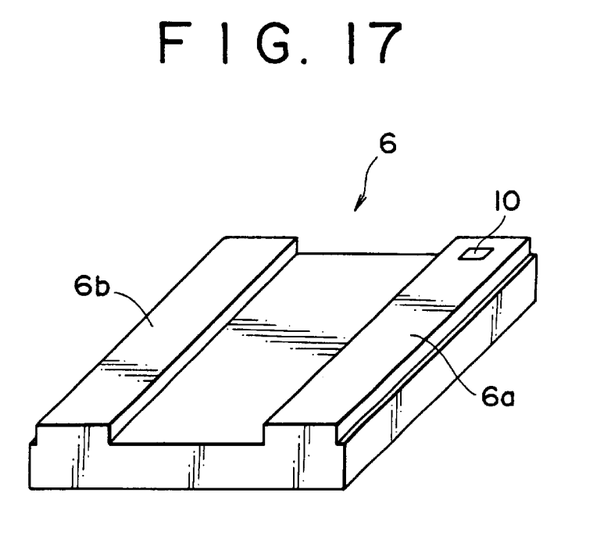
FIG. 17 is a perspective drawing showing an example of a conventional type head slider.

In the head slider 6, rails 6a and 6b which function as air bearing surfaces are formed on both sides in a direction in which the head slider is swung over the magnetic disk 3 under the head slider (hereinafter called a cross direction) as shown in FIG. 17. A magnetic head 10 is mounted at the rear end of one rail 6a.

Hereby, when the head slider 6 approaches the surface of the rotated magnetic disk 3, it receives floating force generated by air flow among the rails 6a and 6b and the surface of the magnetic disk 3 generated as the magnetic disk 3 is rotated. The head slider 6 seeks over the magnetic disk 3, being run with the head slider floating by a minute interval (floated quantity) from the surface of the magnetic disk 3 by the above floating force and the head slider 10 mounted on the head slider 6 reads or records data and the like from/in a predetermined track and the like of the magnetic disk 3 without coming in contact with the magnetic disk. The above floated quantity is generally approximately 0.1 $\mu$m.

Generally, to enhance the electromagnetic transductional characteristic of a magnetic head, it is effective to reduce magnetic spacing between the head slider and a magnetic disk. For one of methods of reducing the above magnetic spacing in the above hard disk 1, there is a method of reducing the floated quantity of the head slider 6. However, when the floated quantity of the head slider 6 is reduced, a hazard such as the head slider 6 may be crushed when shock is applied to the hard disk 1 is increased and the above method is a negative factor in view of the reliability of the hard disk 1.

Therefore, the floated quantity of the head slider 6 is set to a value in which the electromagnetic transductional characteristic of the head slider 10 and the reliability of the hard disk 1 are balanced. That is, the minimum clearance between the head slider 10 and the magnetic disk 3 is required to be always kept fixed. For that, it is desirable that the floated quantity of at least the rail 6a on the side on which the head slider 10 is mounted of the two rails 6a and 6b of the head slider 6 is lower than that of the rail 6b on the side on which the head slider 10 is not mounted.

It is because conversely, if the floated quantity of the rail 6b on the side on which the head slider 10 is not mounted is lower than that of the rail 6a on the side on which the head slider 10 is mounted, the floated quantity of the rail 6b on the side on which the head slider 10 is not mounted is required to be set to the above balanced value, and therefore, as the floated quantity of the rail 6a on the side on which the head slider 10 is mounted is higher than the above balanced value, magnetic spacing between the head slider 10 and the magnetic disk 3 is wasted by the difference.

Figure 18:
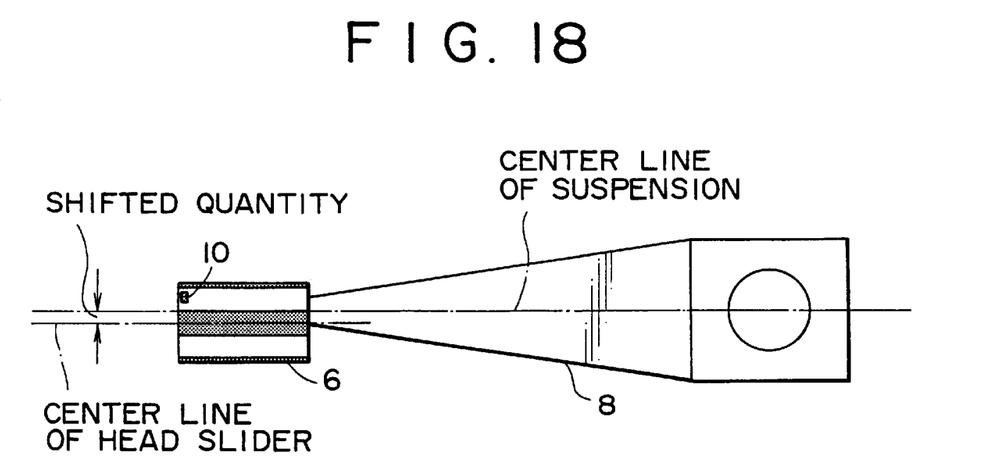
FIG. 18 is a plan showing an example in which the head slider shown in FIG. 17 is attached.

As described above, to set the floated quantity of the rail 6a on the side on which the head slider 10 is mounted so that it is lower than the floated quantity of the rail 6b on the side on which the head slider 10 is not mounted, heretofore, the head slider 6 is bonded to the suspension 8 with the center line of the suspension 8 and the center line of the head slider 6 dislocated by predetermined distance as shown in FIG. 18 so that a larger spring load is applied to the rail 6a on the side on which the head slider 10 is mounted.

As described above, as the conventional type head slider 6 is required to be bonded with the center line and the center line of the suspension 8 displaced by predetermined distance, there is a problem that a precise positioning jig is required. As the upper head and the lower head are different in the direction of displacement, there is also a problem that positioning jigs dedicated to each are required.

SUMMARY OF THE INVENTION

The object of the present invention in view of the above is to provide a head slider capable of enhancing the electromagnetic transductional characteristic of a magnetic head and a magnetic disk unit provided with the head slider.

According to the present invention, the above object is achieved by forming rails asymmetrically so that the floated quantity of a rail on the side on which a magnetic head is mounted is lower than that of a rail on the side on which the head slider is not mounted in a head slider provided with a rail on each side, floated by air flow over a magnetic disk and on the rail on one side of which the head slider for reading or recording information from/in the magnetic disk is mounted.

According to the above constitution, as the floated quantity of the rail on the side on which the head slider is mounted is set so that it is always lower than the floated quantity of the rail on the side on which the head slider is not mounted, magnetic spacing between the head slider and the magnetic disk can be reduced.

DESCRIPTION OF THE PREFERRED EMBODIMENTS

Referring to the attached drawings, suitable embodiments of the present invention will be described in detail below.

As the following embodiments are suitable concrete examples of the present invention, technically suitable various limitations are provided, however, the scope of the present invention is not limited to the following embodiments unless specified.

Figure 1:
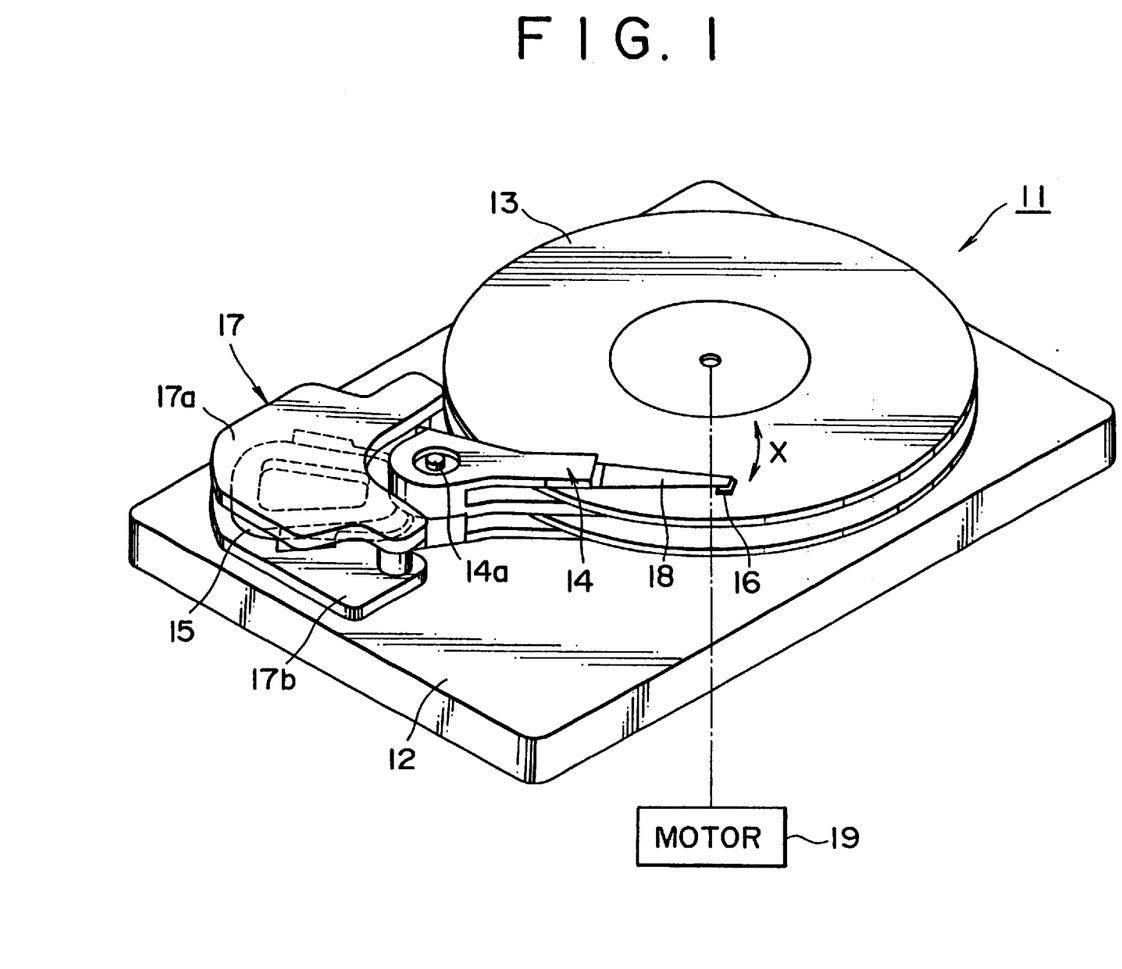
FIG. 1 is a perspective drawing showing a constitutional example of a hard disk equivalent to an embodiment of a magnetic disk unit according to the present invention.

FIG. 1 is a perspective drawing showing a constitutional example of a hard disk equivalent to an embodiment of a magnetic disk unit according to the present invention.

In the hard disk 11, a spindle motor 19 is arranged on the reverse side of the flat part of a housing 12 formed by an aluminum alloy and the like and a magnetic disk 13 rotated at fixed angular velocity by the spindle motor 19 is provided.

Further, an arm 14 is attached around a vertical shaft 14a to the housing 12 so that the arm can be swung. A voice coil 15 is attached to one end of the arm 14, one end of a suspension 18 is attached to the other end of the arm 14 and further, a head slider 16 is attached to the other end of the suspension 18. Magnets 17a and 17b are attached on the housing 12 so that the voice coil 15 is held between the magnets. A voice coil motor 17 is formed by the voice coil 15 and the magnets 17a and 17b.

In such constitution, when a current is supplied to the voice coil 15 from an external device, the arm 14 is turned around the vertical shaft 14a according to force generated by the magnetic field of the magnets 17a and 17b and a current which flows in the voice coil 15. Hereby, the head slider 16 attached to the other end of the arm 14 is swung in the substantially radial direction of the magnetic disk 13. Therefore, a magnetic head mounted on the head slider 16 seeks over the magnetic disk 13 and reads or records data and the like from/in a predetermined track of the magnetic disk 13.

Figure 2:
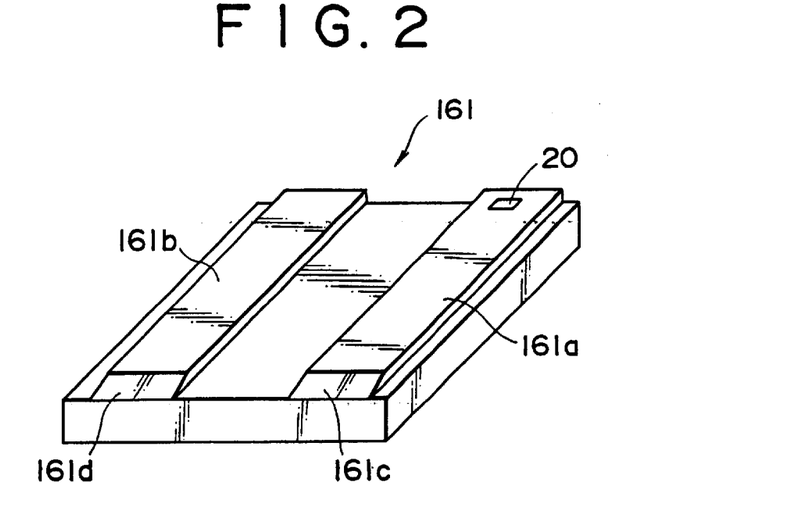
FIG. 2 is a perspective drawing showing a first embodiment of a head slider according to the present invention.
Figure 3:
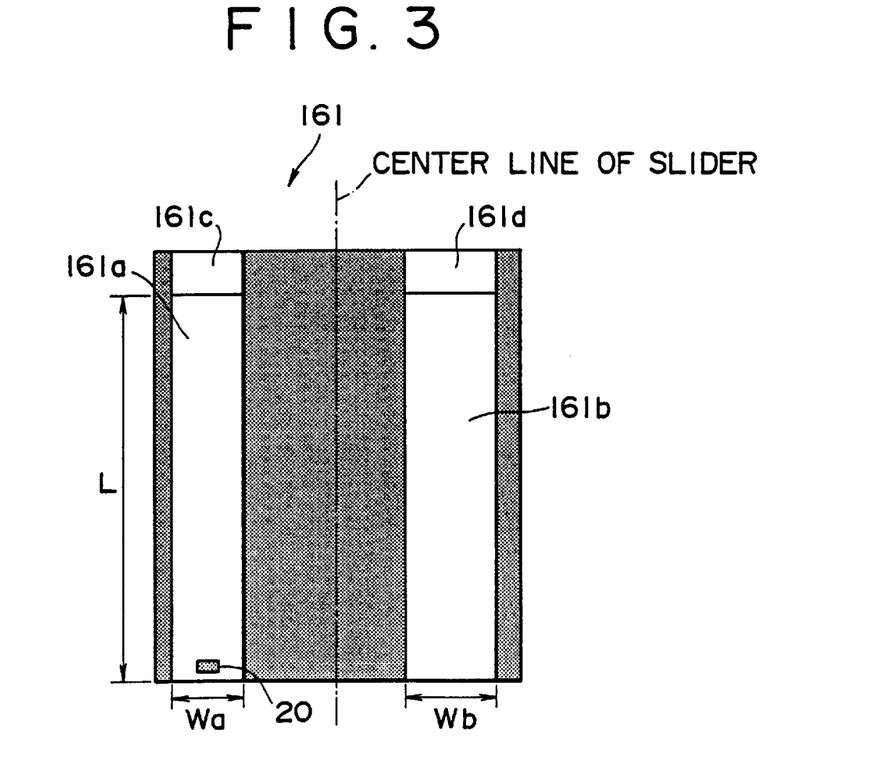
FIG. 3 is a plan showing the head slider shown in FIG. 2.

FIG. 2 is a perspective drawing showing a first embodiment of a head slider according to the present invention and FIG. 3 is a plan of FIG. 2.

A head slider 161 is a positive pressure-type slider, and formed so that the whole shape is a flat rectangular parallelopiped. Two rails 161a and 161b which function as air bearing surfaces which function as a positive pressure generating part are formed on both sides of the surface opposite to the magnetic disk 13 in a direction in which the head slider is swung over the magnetic disk 13 (hereinafter called a cross direction) and tapered parts 161c and 161d which function as an air flow leading part are formed on the air flow entrance side of each of the rails 161a and 161b. A magnetic head 20 is mounted at the rear end of one rail 161a. The head slider 161 may be also formed in another shape, for example in a cube.

The rails 161a and 161b are flat and formed asymmetrically based upon the center line (the axis of symmetry) in the width of the head slider 161. That is, the length L of each of the rails 161a and 161b is the same and the width Wa of the rail 161a on the side on which the head slider 20 is mounted is formed so that it is narrower than the width Wb of the rail 161b on the side on which the head slider 20 is not mounted. Therefore, as the area of the rail 161a on the side on which the head slider 20 is mounted is smaller than the area of the rail 161b on the side on which the head slider 20 is not mounted, positive pressure generated in the rail 161a on the side on which the head slider 20 is mounted is smaller than positive pressure generated in the rail 161b on the side on which the head slider 20 is not mounted.

As a result, the head slider 161 is floated with it tilted so that the rail 161a on the side on which the head slider 20 is mounted is floated lower and the floated quantity of the rail 161a on the side on which the head slider 20 is mounted can be adjusted to a value in which the electromagnetic transductional characteristic of the head slider 20 and the reliability of the hard disk 11 are balanced.

Figure 4:
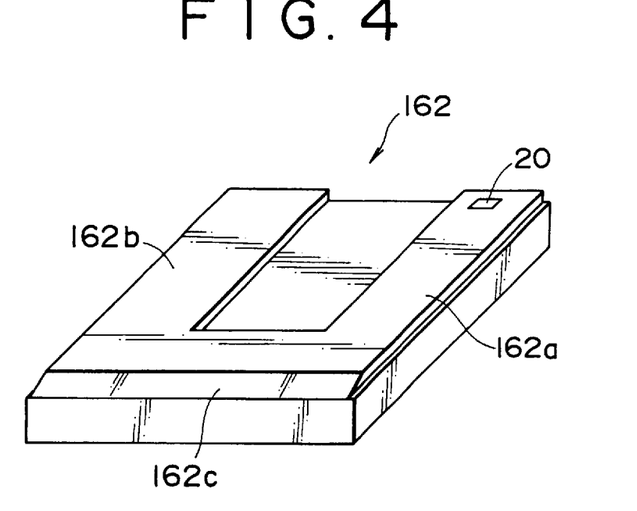
FIG. 4 is a perspective drawing showing a second embodiment of the head slider according to the present invention.
Figure 5:
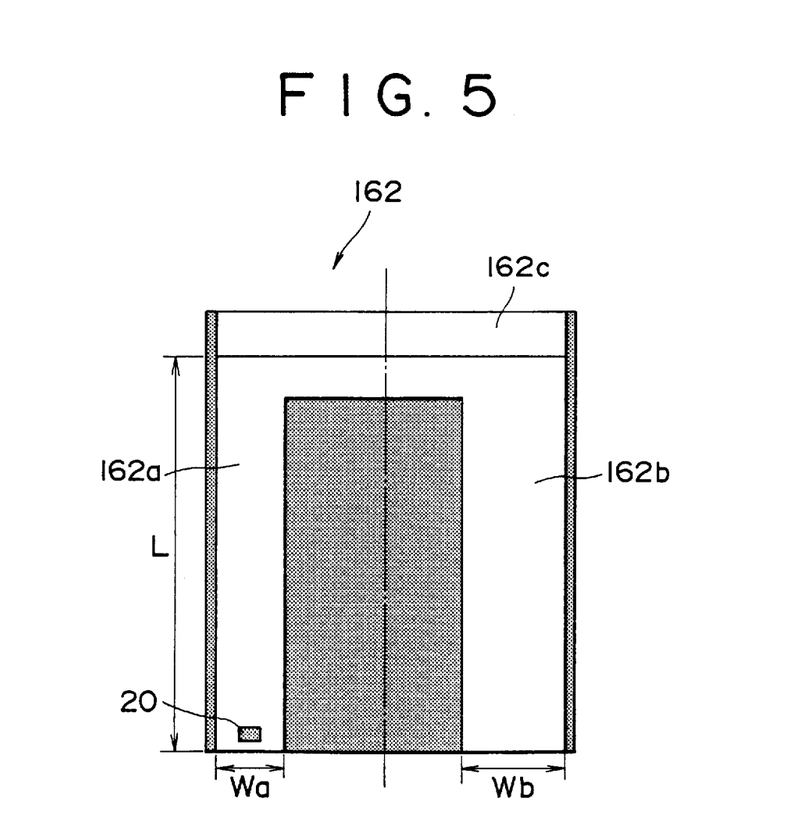
FIG. 5 is a plan showing the head slider shown in FIG. 4.

FIG. 4 is a perspective drawing showing a second embodiment of the head slider according to the present invention and FIG. 5 is a plan of FIG. 4.

A head slider 162 is a negative pressure-type slider, and formed so that the whole shape is a flat rectangular parallelopiped. Two rails 162a and 162b which function as air bearing surfaces which function as a positive pressure generating part are formed on both sides of the surface opposite to the magnetic disk 13 in a direction in which the head slider is swung over the magnetic disk 13 (hereinafter called a cross direction) and a tapered part 162c which functions as an air flow leading part is formed on the air flow entrance side of each of the rails 162a and 162b so that the tapered part closes the air flow entrance of each of the rails 162a and 162b. Therefore, an area surrounded by each of the rails 162a and 162b and the tapered part 162c acts as a negative pressure generating part. A magnetic head 20 is mounted at the rear end of one rail 162a. The head slider 162 may be also formed in another shape, for example in a cube.

The rails 162a and 162b are flat and formed asymmetrically based upon the center line (the axis of symmetry) in the width of the head slider 162. That is, the length L of each of the rails 162a and 162b is the same and the width Wa of the rail 162a on the side on which the head slider 20 is mounted is formed so that it is narrower than the width Wb of the rail 162b on the side on which the head slider 20 is not mounted.

Therefore, as the area of the rail 162a on the side on which the head slider 20 is mounted is smaller than the area of the rail 162b on the side on which the head slider 20 is not mounted, positive pressure generated in the rail 162a on the side on which the head slider 20 is mounted is smaller than positive pressure generated in the rail 162b on the side on which the head slider 20 is not mounted. As a result, the head slider 162 is floated with it tilted so that the rail 162a on the side on which the head slider 20 is mounted is floated lower and the floated quantity of the rail 162a on the side on which the head slider 20 is mounted can be adjusted to a value in which the electromagnetic transductional characteristic of the head slider 20 and the reliability of the hard disk 11 are balanced.

Figure 6:
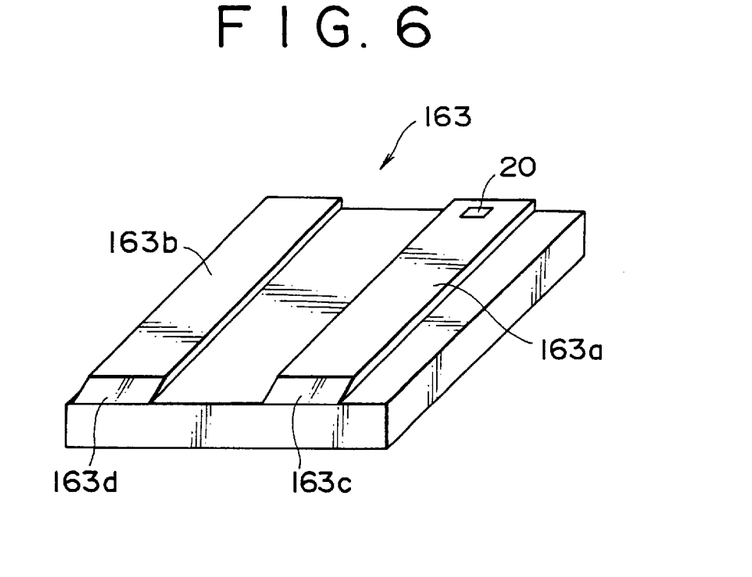
FIG. 6 is a perspective drawing showing a third embodiment of the head slider according to the present invention.
Figure 7:
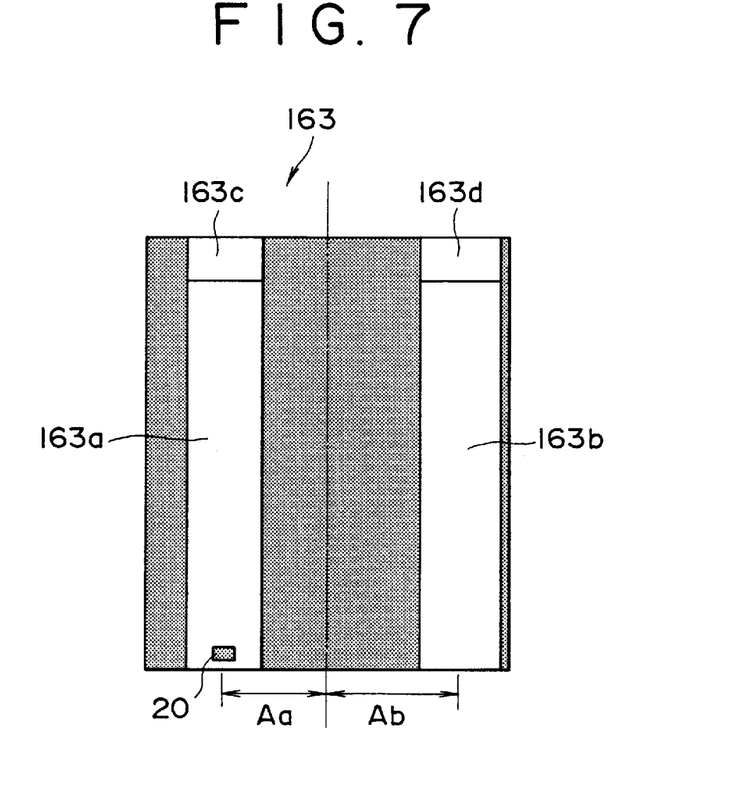
FIG. 7 is a plan showing the head slider shown in FIG. 6.

FIG. 6 is a perspective drawing showing a third embodiment of the head slider according to the present invention and FIG. 7 is a plan of FIG. 6.

A head slider 163 is a positive pressure-type slider, and formed so that the whole shape is a flat rectangular parallelopiped. Two rails 163a and 163b which function as air bearing surfaces which function as a positive pressure generating part are formed on both sides of the surface opposite to the magnetic disk 13 in a direction in which the head slider is swung over the magnetic disk 13 (hereinafter called a cross direction) and tapered parts 163c and 163d which function as an air flow leading part are formed on the air flow entrance side of each of the rails 163a and 163b. A magnetic head 20 is mounted at the rear end of one rail 163a. The head slider 163 may be also formed in another shape, for example in a cube.

The rails 163a and 163b are flat and formed asymmetrically based upon the center line (the axis of symmetry) in the width of the head slider 163. That is, the rails are formed so that distance Aa between the center line (the axis of symmetry) in the width of the head slider 163 and the center line in the width of the rail 163a is shorter than distance Ab between the center line (the axis of symmetry) in the width of the head slider 163 and the center line in the width of the rail 163b. That is, the rails are formed so that the rail 163a on the side on which the head slider 20 is mounted is closer to the center line (the axis of symmetry) in the width of the head slider 163 than the rail 163b on the side on which the head slider 20 is not mounted.

Therefore, the moment by positive pressure generated in the rail 163a on the side on which the head slider 20 is mounted is smaller than the moment by positive pressure generated in the rail 163b on the side on which the head slider 20 is not mounted. As a result, the head slider 163 is floated with it tilted so that the rail 163a on the side on which the head slider 20 is mounted is floated lower and the floated quantity of the rail 163a on the side on which the head slider 20 is mounted can be adjusted to a value in which the electromagnetic transductional characteristic of the head slider 20 and the reliability of the hard disk 11 are balanced.

Figure 8:
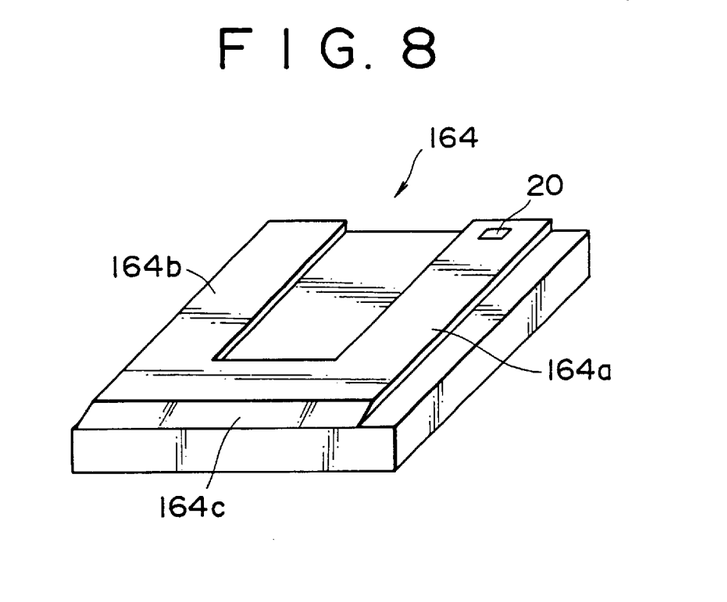
FIG. 8 is a perspective drawing showing a fourth embodiment of the head slider according to the present invention.
Figure 9:
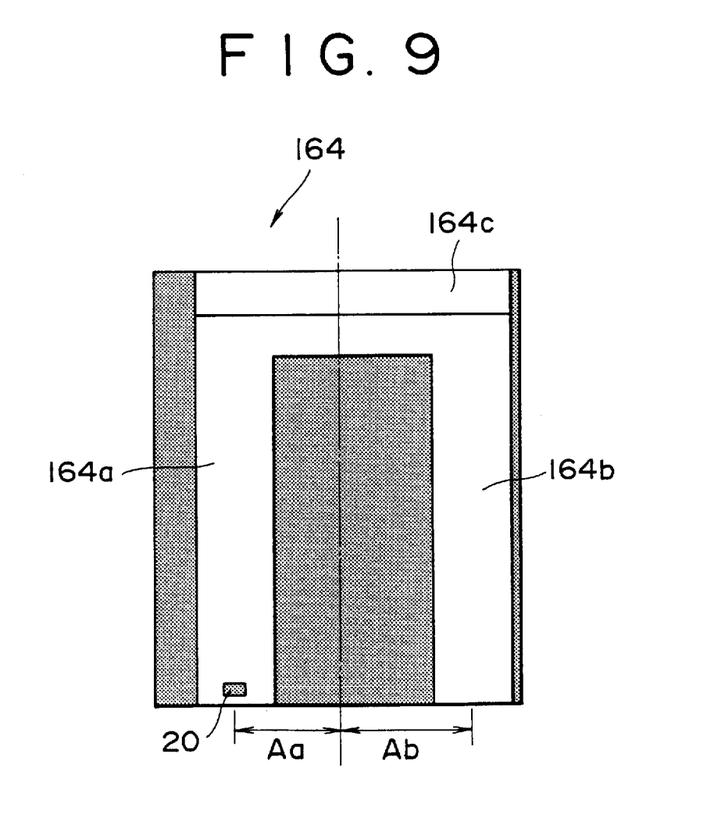
FIG. 9 is a plan showing the head slider shown in FIG. 8.

FIG. 8 is a perspective drawing showing a fourth embodiment of the head slider according to the present invention and FIG. 9 is a plan of FIG. 8.

A head slider 164 is a negative pressure-type slider, and formed so that the whole shape is a flat rectangular parallelopiped. Two rails 164a and 164b which function as air bearing surfaces which function as a positive pressure generating part are formed on both sides of the surface opposite to the magnetic disk 13 in a direction in which the head slider is swung over the magnetic disk 13 (hereinafter called a cross direction) and a tapered part 164c which functions as an air flow leading part is formed on the air flow entrance side of each of the rails 164a and 164b so that the tapered part closes the air flow entrance of each of the rails 164a and 164b. Therefore, an area surrounded by each of the rails 164a and 164b and the tapered part 164c acts as a negative pressure generating part. A magnetic head 20 is mounted at the rear end of one rail 164a. The head slider 164 may be also formed in another shape, for example in a cube.

The rails 164a and 164b are flat and formed asymmetrically based upon the center line (the axis of symmetry) in the width of the head slider 164. That is, the rails are formed so that distance Aa between the center line (the axis of symmetry) in the width of the head slider 164 and the center line in the width of the rail 164a is shorter than distance Ab between the center line (the axis of symmetry) in the width of the head slider 164 and the center line in the width of the rail 164b. That is, the rails are formed so that the rail 164a on the side on which the head slider 20 is mounted is closer to the center line (the axis of symmetry) in the width of the head slider 164 than the rail 164b on the side on which the head slider 20 is not mounted.

Therefore, the moment by positive pressure generated in the rail 164a on the side on which the head slider 20 is mounted is smaller than the moment by positive pressure generated in the rail 164b on the side on which the head slider 20 is not mounted. As a result, the head slider 164 is floated with it tilted so that the rail 164a on the side on which the head slider 20 is mounted is floated lower and the floated quantity of the rail 164a on the side on which the head slider 20 is mounted can be adjusted to a value in which the electromagnetic transductional characteristic of the head slider 20 and the reliability of the hard disk 11 are balanced.

Figure 10:
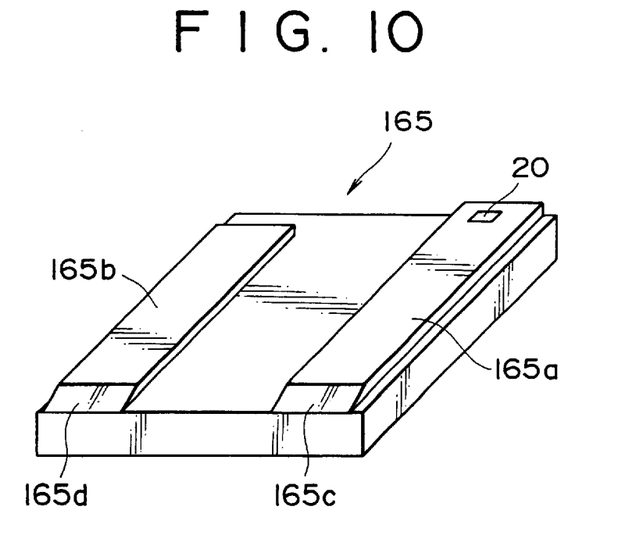
FIG. 10 is a perspective drawing showing a fifth embodiment of the head slider according to the present invention.
Figure 11:
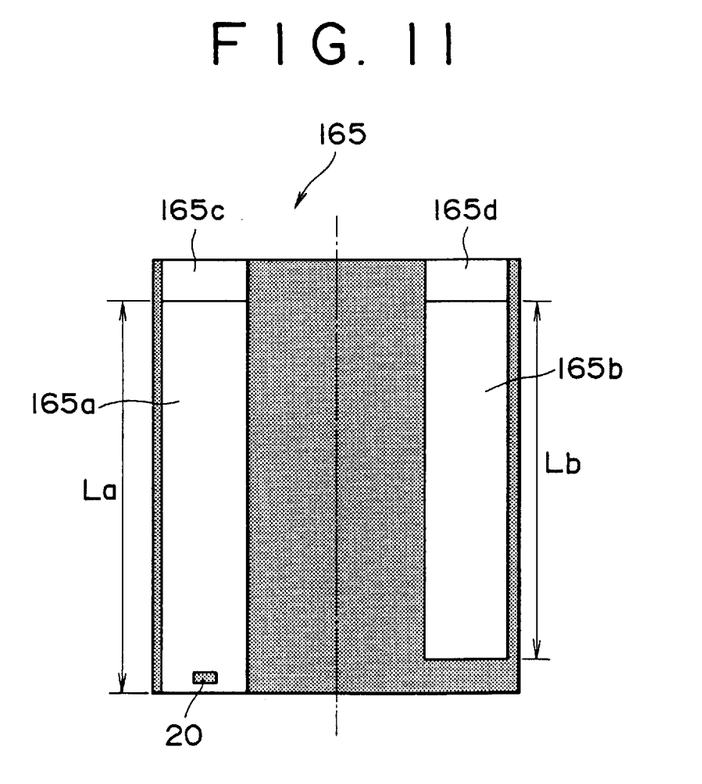
FIG. 11 is a plan showing the head slider shown in FIG. 10.

FIG. 10 is a perspective drawing showing a fifth embodiment of the head slider according to the present invention and FIG. 11 is a plan of FIG. 10.

A head slider 165 is a positive pressure-type slider, and formed so that the whole shape is a flat rectangular parallelopiped. Two rails 165a and 165b which function as air bearing surfaces which function as a positive pressure generating part are formed on both sides of the surface opposite to the magnetic disk 13 in a direction in which the head slider is swung over the magnetic disk 13 (hereinafter called a cross direction) and tapered parts 165c and 165d which function as an air flow leading part are formed on the air flow entrance side of each of the rails 165a and 165b. A magnetic head 20 is mounted at the rear end of one rail 165a. The head slider 165 may be also formed in another shape, for example in a cube.

The rails 165a and 165b are flat and formed asymmetrically based upon the center line (the axis of symmetry) in the width of the head slider 165. That is, the rails are formed so that the length La of the rail 165a on the side on which the head slider 20 is mounted is longer than the length Lb of the rail 165b on the side on which the head slider 20 is not mounted. That is, the rail 165b on the side on which the head slider 20 is not mounted is formed so that the length of the rail 165b is shorter by the length of a part in which the head slider 20 is mounted of the rail 165a on the side on which the head slider 20 is mounted.

Therefore, as no part floated lower than the part in which the head slider 20 is mounted exists, the head slider 165 is floated with it tilted so that the rail 165a on the side on which the head slider 20 is mounted is floated lower and the floated quantity of the rail 165a on the side on which the head slider 20 is mounted can be adjusted to a value in which the electromagnetic transductional characteristic of the head slider 20 and the reliability of the hard disk 11 are balanced.

Figure 12:
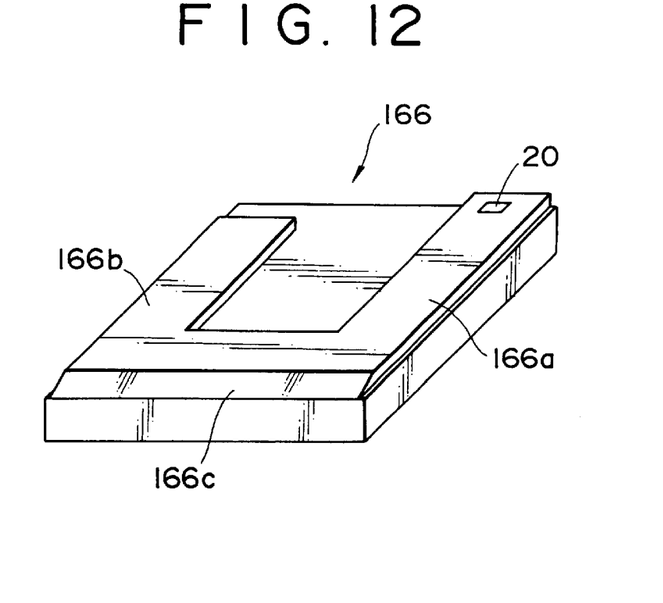
FIG. 12 is a perspective drawing showing a sixth embodiment of the head slider according to the present invention.
Figure 13:
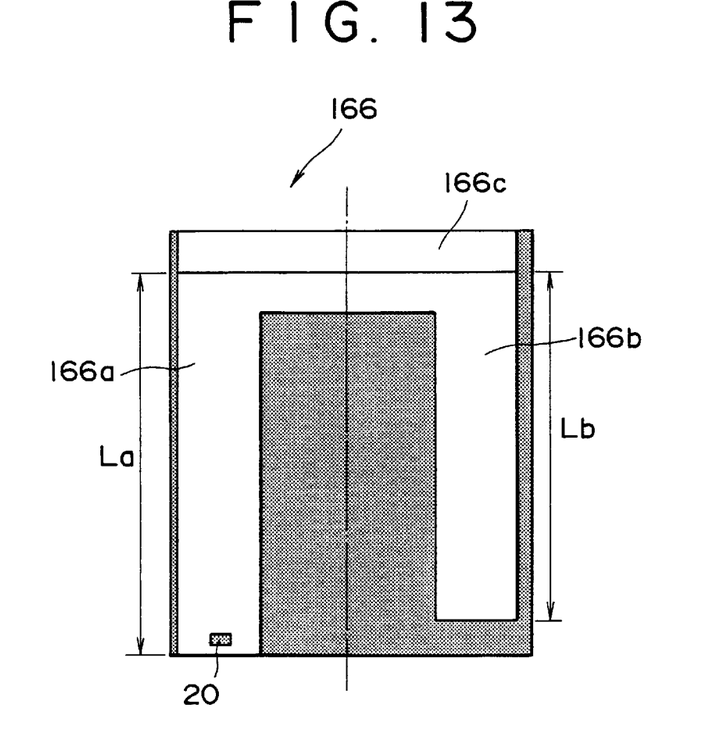
FIG. 13 is a plan showing the head slider shown in FIG. 12.

FIG. 12 is a perspective drawing showing a sixth embodiment of the head slider according to the present invention and FIG. 13 is a plan of FIG. 12.

A head slider 166 is a negative pressure-type slider, and formed so that the whole shape is a flat rectangular parallelopiped. Two rails 166a and 166b which function as air bearing surfaces which function as a positive pressure generating part are formed on both sides of the surface opposite to the magnetic disk 13 in a direction in which the head slider is swung over the magnetic disk 13 (hereinafter called a cross direction) and a tapered part 166c which functions as an air flow leading part is formed on the air flow entrance side of each of the rails 166a and 166b so that the tapered part closes the air flow entrance of each of the rails 166a and 166b. Therefore, an area surrounded by each of the rails 166a and 166b and the tapered part 166c acts as a negative pressure generating part. A magnetic head 20 is mounted at the rear end of one rail 166a. The head slider 166 may be also formed in another shape, for example in a cube.

The rails 166a and 166b are flat and formed asymmetrically based upon the center line (the axis of symmetry) in the width of the head slider 166. That is, the rails are formed so that the length La of the rail 166a on the side on which the head slider 20 is mounted is longer than the length Lb of the rail 166b on the side on which the head slider 20 is not mounted. That is, the rail 166b on the side on which the head slider 20 is not mounted is formed so that the length of the rail 166b is shorter by the length of a part in which the head slider 20 is mounted of the rail 166a on the side on which the head slider 20 is mounted.

Therefore, as no part floated lower than the part in which the head slider 20 is mounted exists, the head slider 166 is floated with it tilted so that the rail 166a on the side on which the head slider 20 is mounted is floated lower and the floated quantity of the rail 166a on the side on which the head slider 20 is mounted can be adjusted to a value in which the electromagnetic transductional characteristic of the head slider 20 and the reliability of the hard disk 11 are balanced.

Even if two or more of the first, third and fifth embodiments of the above embodiments are combined or two or more of the second, fourth and sixth embodiments are combined, the similar effect can be produced.

Figure 14:
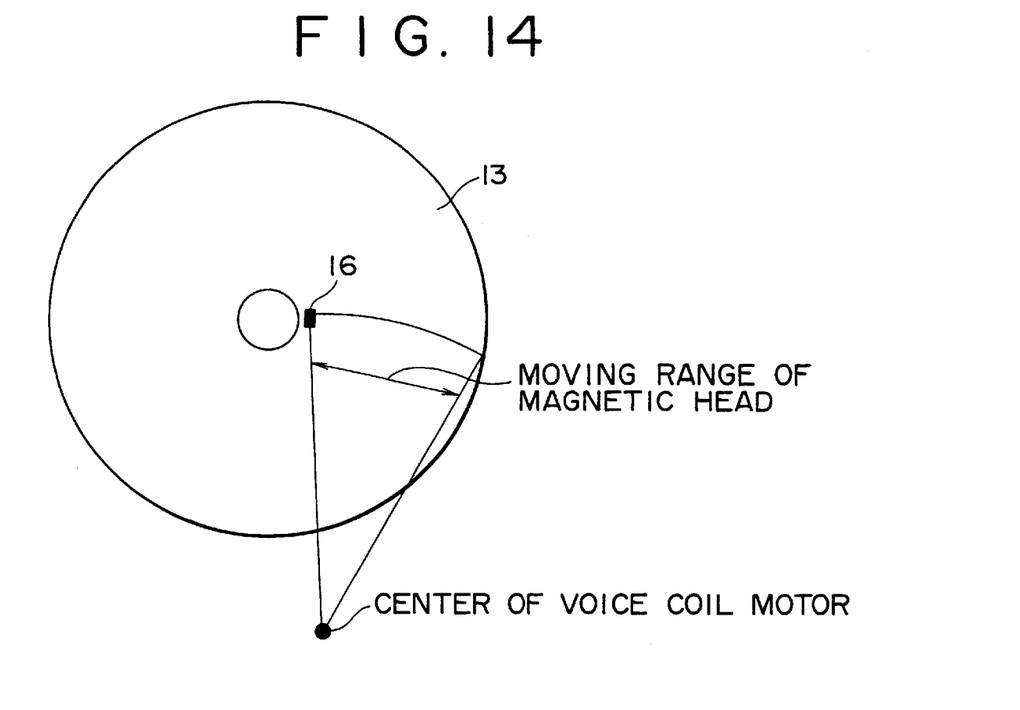
FIG. 14 is a plan showing a range in which a magnetic head mounted in the embodiments of the head slider according to the present invention is moved.
Figure 15:
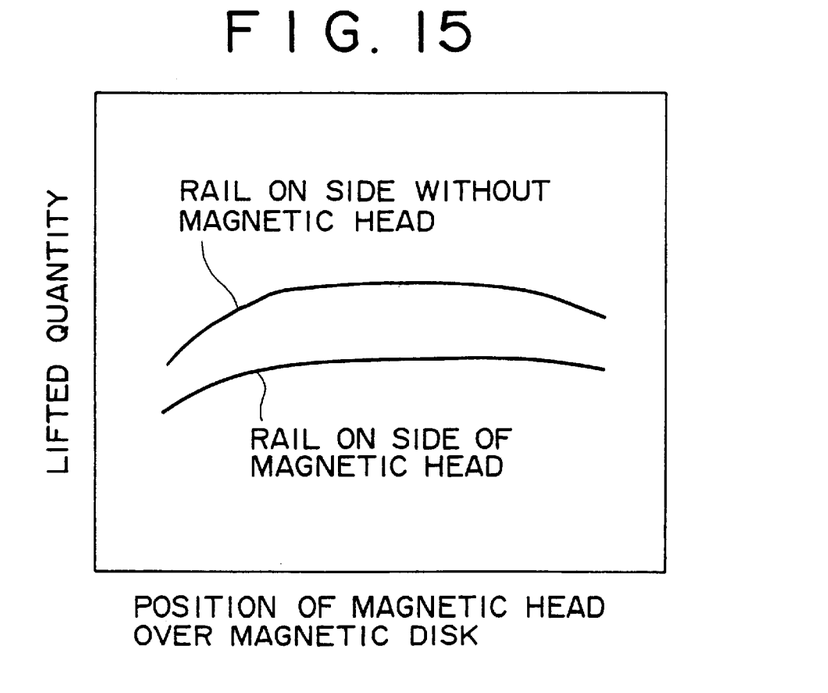
FIG. 15 shows a relationship between the floated quantity in the embodiments of the head slider according to the present invention and an example of a conventional type head slider and the position of each magnetic head over a magnetic disk.

FIG. 14 is a plan showing a range in which the head slider 20 is moved when the head slider 16 seeks over the magnetic disk 13 by the voice coil motor 17. FIG. 15 shows an example of the change of the floated quantity of the rail of the head slider 16 on the side on which the head slider 20 is mounted and the change of the floated quantity of the rail on the side on which the head slider 20 is not mounted respectively in the above moved range.

As clear from FIG. 15, even if the head slider 20 is located in any position over the magnetic disk 13, the floated quantity of the rail on the side on which the head slider 20 is mounted is always lower than the floated quantity of the rail on the side on which the head slider 20 is not mounted.

As described above, as the floated quantity of the rail on the side on which the head slider 20 is mounted is always lower than the floated quantity of the rail on the side on which the head slider 20 is not mounted, the electromagnetic transductional characteristic of the head slider 20 and the reliability of the hard disk 11 can be both optimized.

As the hard disk can be assembled by aligning the center line of the head slider 16 and that of the suspension 18, it can be assembled using the same positioning jig independent of the lifting and lowering of the head slider 20 and further, at that time, the location of the head slider 20 and the suspension 18 can be fixed. Therefore, the efficiency of assembly and the precision can be enhanced and a cost required for a positioning jig and the like can be reduced.

In the above embodiments, the shape of the rail of the head slider 16 is described as a simple tapered flat type, however, the shape is not limited to it.

As described above, according to the present invention, the electromagnetic transductional characteristic of a magnetic head can be enhanced.

What is claimed is:

1. A head slider provided with a rail on each side of a center line but on the same side of the head slider relative to a disk, said slider being floated over a disk by an air flow on said rails, a head for reading or recording information from/in said disk being mounted on one side of said center line, wherein:

said rails are asymmetrically formed about the center line so that the side of the head slider on which said head is mounted floats over the disk at a level lower than that of the other side of the center line on which said head is not mounted, said rails extend longitudinally on opposite sides of the center line, said rail located on the side of the center line on which said head is mounted floats over the disk at a level lower than that of the rail located on the side of the center line on which said head is not mounted, the rail located on the side of the center line on which said head is mounted is smaller in width, as measured laterally, than the rail located on the side of the center line on which said head is not mounted, and said rails each having a cross-sectional shape in a direction perpendicular to the center line which is a parallelogram with no right angles.

2. A head slider according to claim 1, wherein:

the rails are shaped so that a surface area of the rail on the side on which the head is mounted is smaller than that of the rail on the side on which the head is not mounted; and positive pressure is generated by said air flow.

3. A head slider according to claim 1, wherein:

the rails are shaped so that a surface area of the rail on the side on which the head is mounted is smaller than that of the rail on the side on which the head is not mounted; and negative pressure is generated by said air flow.

4. A head slider according to claim 1, wherein:
the asymmetrical formation of said rails comprises the position of the rail on the side on which the head is mounted is closer to the the center line than the position of the rail on the side on which the head is not mounted; and positive pressure is generated by said air flow.

5. A head slider according to claim 1, wherein:
the asymmetrical formation of said rails comprises the position of the rail on the side on which the head is mounted is closer to the the center line than the position of the rail on the side on which the head is not mounted; and negative pressure is generated by said air flow.

6. A head slider according to claim 1, wherein:
the asymmetrical formation of said rails comprises the position of the rail on the side on which the head is mounted is closer to the the center line than the position of the rail on the side on which the head is not mounted; and positive pressure is generated by said air flow.

7. A head slider according to claim 1, wherein:
the asymmetrical formation of said rails comprises the position of the rail on the side on which the head is mounted is closer to the the center line than the position of the rail on the side on which the head is not mounted; and negative pressure is generated by said air flow.

8. A disk unit, comprising:

a disk for recording information;

a head slider comprising first and second rails extending in parallel along a bottom side of the head slider, the first and second rails being positioned on opposite sides of a center line of the head slider; and a head mounted on one side of said center line for reading or recording information from/in said disk, wherein, said rails are asymmetrically formed about the center line so that the side of the head slider on which said head is mounted floats over the disk at a level lower than that of the other side of the center line on which the head is not mounted, said rails extend longitudinally on opposite sides of the center line, said rail located on the side of the center line on which said head is mounted floats over the disk at a level lower than that of the rail located on the side of the center line on which said head is not mounted, the rail located on the side of the center line on which said head is mounted is smaller in width, as measured laterally, than the rail located on the side of the center line on which said head is not mounted, and said rails each having a cross-sectional shape in a direction perpendicular to the center line which is a parallelogram with no right angles.

9. A head slider comprising first and second rails extending in parallel along a bottom side of the head slider, the first and second rails being positioned on opposite sides of a center line of the head slider; and a magnetic transducer mounted on one of the rails, the rails being shaped differently so that the one rail on which the head is mounted floats at a lower level than the other rail relative to a medium, the rails extend longitudinally on opposite sides of the center line; said side of the head slider on which said head is mounted floats over the disk at a level lower than that of the other side on which said head is not mounted; the rail located on the side of the center line on which said head is mounted is smaller in width, as measured laterally, than the rail located on the side of the center line on which said head is not mounted; and said rails each having a cross-sectional shape in a direction perpendicular to the center line which is a parallelogram with no right angles.

10. The head slider of claim 9, where the one rail on which the head is mounted is longer than the other rail.

11. The head slider of claim 9, wherein the one rail on which the head is mounted has a larger volume than the other rail.

12. The head slider of claim 9, wherein the one rail on which the head is mounted is positioned closer to the center line than is the other rail.

* * * * *